(12) United States Patent
Hankel

(10) Patent No.: US 6,969,106 B1
(45) Date of Patent: Nov. 29, 2005

(54) TARP BOW STORING APPARATUS

(76) Inventor: Timothy D. Hankel, 111 Sheps Rd., Townsend, MT (US) 59644

(*) Notice: Subject to any disclaimer, the term of this patent is extended or adjusted under 35 U.S.C. 154(b) by 0 days.

(21) Appl. No.: 11/105,378

(22) Filed: Apr. 14, 2005

(51) Int. Cl.[7] .................................................. B60P 7/04
(52) U.S. Cl. .................................. 296/100.18; 296/37.1
(58) Field of Search ....................... 296/43, 37.1, 37.6, 296/100.17, 100.18, 100.01

(56) References Cited

U.S. PATENT DOCUMENTS

| | | |
|---|---|---|
| 2,954,200 A | 9/1960 | Gannon et al. |
| 3,291,427 A | 12/1966 | Hutchings |
| 4,342,480 A | 8/1982 | Ross, Jr. |
| 4,453,761 A * | 6/1984 | Felburn ....................... 296/43 |
| 4,700,917 A | 10/1987 | Dillman |
| 4,881,674 A | 11/1989 | Medianik |
| 5,007,672 A * | 4/1991 | Koch .................... 296/100.18 |
| 5,080,422 A | 1/1992 | DeMonte et al. |
| 5,338,084 A | 8/1994 | Wardell |

* cited by examiner

Primary Examiner—Joseph D. Pape
(74) Attorney, Agent, or Firm—William L. MacBride, Jr.

(57) ABSTRACT

A tarp bow storing apparatus for storing a plurality of tarp bows to a flat bed trailer comprising two holding blocks and a pivoting center block, having a plurality of spaced apertures, and mounting arrangement for engaging and secure the first holding block and second holding block, and pivoting center block to underside support beams of the flat bed trailer. Each mounting arrangement includes a pair of bracket members adapted to overlie and be disposed on opposite sides of bottom flanges to the underside support beams in order to attach the blocks. The pivoting center block has a stationary portion and a pivoting portion, each having a stationary edge and a pivoting edge, respectively, to receive and lock said middle sections of each of said tarp bows securely in place within the spaced apertures and align the tarp bows in a stacked fashion.

10 Claims, 8 Drawing Sheets

TARP BOW STORING APPARATUS

BACKGROUND OF THE INVENTION

The present invention relates to the field of storing tarp bows used on tractor trailer flat beds. More particularly, the invention is directed to storing the tarp bows efficiently and conveniently to an underside of the flat bed trailer.

The flat beds of tractor trailers utilize tarp enclosures under which cargo loads are transported. Tarp bows, also termed roof bows, are tubes made of plastic, steel, aluminum, or other metal or other rigid material, constructed in a curvilinear mold, or arcuate or bow shape, to arc over a shipment of cargo transported on a flatbed trailer, upon which a tarp is draped. Tarp bows are used to support the tarps enclosing a cargo load. Flatbed trailers utilize tarp bows to hold tarps in place over shipments in transit on a trailer flatbed. The present invention provides a more convenient storage for the tarp bows used on tractor, truck, or other types of trailer flat beds.

The present invention stores tarp bows on a flatbed trailer by the use of holding and pivoting blocks that are fastened under the deck of the trailer by brackets. One or more middle, pivoting blocks or pieces are provided to align and stabilize the storage of the tarp bows. Each end of a tarp bow is fitted into the holding blocks or pieces. The center sections of the tarp bows are locked into place by the use of the middle pivoting block or piece, which fits around the tarp bows or tubes.

As known in the related art, there are systems for manipulating a tarp bow enclosing system, for supporting a tarp over the top of the cargo, and for covering and uncovering cargo on the flat bed. When the tarp bows are not required, they must be stored somewhere on or under the flat bed trailer. Other related art provides for storage of the tarp bows on the landing gear of the trailer, by tarp bows being strapped to the landing gear by bungee cords or other fastenings. This storage option is extremely unstable and dangerous, having the potential of the tarp bows becoming dislodged in transit and falling onto the road as dangerous obstacles for other road traffic.

Another well-known means of storing tarp bows is to store them somewhere on the deck of the trailer, either in a vertically stacked manner or stacked horizontally, in either case taking up potentially valuable cargo shipment space on the deck of the flatbed. It is a common means to store the tarp bows vertically in a "headache rack" located at the front or bulkhead of a trailer immediately behind the cab of a tractor or truck. This use of the headache rack for tarp bow storage is an inefficient and uneconomic use of space. To date, there has been no safe, efficient and cost-effective manner known in the related art for storing tarp bows on or under a flat bed of a trailer. An apparatus is needed that shippers and other flat bed trailer operators can use to safely and efficiently store the tarp bows when not in use without using up valuable cargo space. This apparatus also must be convenient to use and simple to install on the flat bed.

The present invention is a tarp bow storing apparatus for storing a plurality of tarp bows to a flat bed trailer comprising two holding blocks and one or more pivoting center block, all having a plurality of spaced apertures for receiving and securing tarp bows. Accordingly, it is an object and advantage of the present invention to provide an apparatus and method for storing tarp bows underneath trailer flat beds, without using cargo space. It is another object and advantage of the present invention to provide an apparatus and method to secure the tarp bows in a manner that provides for safe and efficient storage.

Related art provides information regarding tarp bow use and enclosure systems, as examples: U.S. Pat. No. 5,080,422 to DeMonte; U.S. Pat. No. 5,338,084 to Wardell, and U.S. Pat. No. 4,342,480 to Ross, Jr. However, none of these patents provide the storing apparatus of the present invention and the feature of storing the tarp bows underneath the trailer of the flat bed. Other related art provides information regarding storing devices, as examples: U.S. Pat. No. 4,881,674 to Mediank, and U.S. Pat. No. 3,292,427 to Hutchings. However, these patents relate to storing fishing rods, not to transport of cargo and storage of tarp bows. None of these patents provide the storing apparatus of the present invention and the feature of storing and securing the tarp bows underneath the trailer of the flat bed. Therefore, none of the related art provides the features of the tarp bow storage apparatus found in the present invention.

Still further objects and advantages of the present invention will become apparent from a consideration of the ensuing descriptions and drawings.

SUMMARY OF THE INVENTION

In accordance with the present invention, in one embodiment the invention includes a tarp bow storing apparatus for storing a plurality of tarp bows to a flat bed trailer comprising two holding blocks having a plurality of spaced apertures linearly located vertically, and formed through the holding blocks on opposing front and back sides, for receiving and securing the tarp bows. Each of said tarp bows has a first free end and a second free end received and secured by the first holding block and the second holding block, respectively, and at least one middle section received and secured by at least one pivoting center block. The spaced apertures are spaced, sized and located in the blocks in a cooperative manner to receive, align, and secure the tarp bows. The first and second holding blocks have respective first and second opposing inward closed and outward closed sides adjacent to front and back aperture sides, top sides and bottom sides, and mounting means, vertically attached to each of the holding blocks along the outward closed sides by fastening means. The flat bed trailer has a plurality of underside support beams, each having top flanges and bottom flanges and a web, to which the first and second mounting means engage and secure the first holding block and second holding block, respectively. The at least one pivoting center block has a plurality of center spaced apertures formed through the pivoting center block and cooperatively sized and linearly located vertically on opposing lefthand and righthand aperture sides of the at least one pivoting center block, for receiving and securing at least one middle section of said tarp bows; as well as a top edge and a bottom edge. A center mounting means is vertically attached by a fastening means to the righthand aperture side of the at least one pivoting center block to engage and secure said pivoting center block to said underside support beam. Each mounting means to said blocks includes a pair of bracket members, extending above the top side of the holding blocks, and the top edge of the pivoting center block, the mounting means being adapted to overlie and be disposed on opposite sides of bottom flanges to said underside support beams, in order to attach said blocks to the underside support beams. The apertures to the said blocks are longitudinally aligned to concurrently receive the first and second free end and the at least one middle section of each of said tarp bows in spaced relation.

In accordance with the present invention, in one embodiment the apparatus includes at least one pivoting center block with a stationary portion and a pivoting portion, having a stationary edge and a pivoting edge, respectively, adjoining each other along a line bisecting a plurality of center spaced apertures. The stationary portion is pivotally and cooperatively connected to the pivoting portion by a pivoting means located along the line bisecting said center spaced apertures and located proximate to the bottom edge of the at least one pivoting center block. The pivoting means pivots said pivoting portion away from the stationary portion, enabling the at least one pivoting center block to receive each of said middle sections of said tarp bows within the center spaced apertures along the stationary edge of the stationary portion. Each of said middle sections of each tarp bow is enclosed and locked within the center spaced apertures of said pivoting center block by a locking means when the pivoting portion pivots toward the stationary portion. The locking means is located along the line bisecting said plurality of center spaced apertures and proximate to the top edge of said pivoting center block. Said pivoting center block is cooperatively located in spaced relation between the first and second holding blocks, to receive and secure said middle sections of each of said tarp bows securely in place and align said tarp bows in a stacked fashion, whereby the tarp bows are stored to said underside of the flat bed trailer.

In one embodiment, the apparatus includes exactly one pivoting center block.

In one embodiment, the apparatus includes a first holding block, a second holding block, at least one pivoting center block, and bracket members of the mounting means that are metal.

In one embodiment, the apparatus includes bracket members of the mounting means that are modified to overlie and be disposed on support beams having only one flange.

In other embodiments, the mounting means are vertically attached to alternate sides of their respective holding blocks, and alternate aperture sides of said pivoting center block.

Other and further objects and advantages of the present invention will appear hereinafter.

BRIEF DESCRIPTION OF THE DRAWINGS

Other objects and features of the invention are explained and will become apparent from the following detailed description taken in combination with the accompanying drawings. However, the drawings are provided for purpose of illustration only, and are not intended as a definition of the limits of the invention.

Similar reference characters denote corresponding features consistently throughout the accompanying drawings.

DETAILED DESCRIPTION OF THE INVENTION

The present invention will now be described more fully hereinafter with references to the accompanying drawings, in which the preferred embodiment of the invention is shown. This invention may, however, be embodied in different forms, and should not be construed as limited to the embodiment set forth herein. Rather, the illustrative embodiments are provided so that this disclosure will be thorough and complete, and will full convey the scope of the invention to those skilled in the art. It should be noted and will be appreciated that numerous variations may be made within the scope of this invention without departing from the principle of this invention and without sacrificing its chief advantages. Like numbers refer to like elements throughout.

Figure 1:
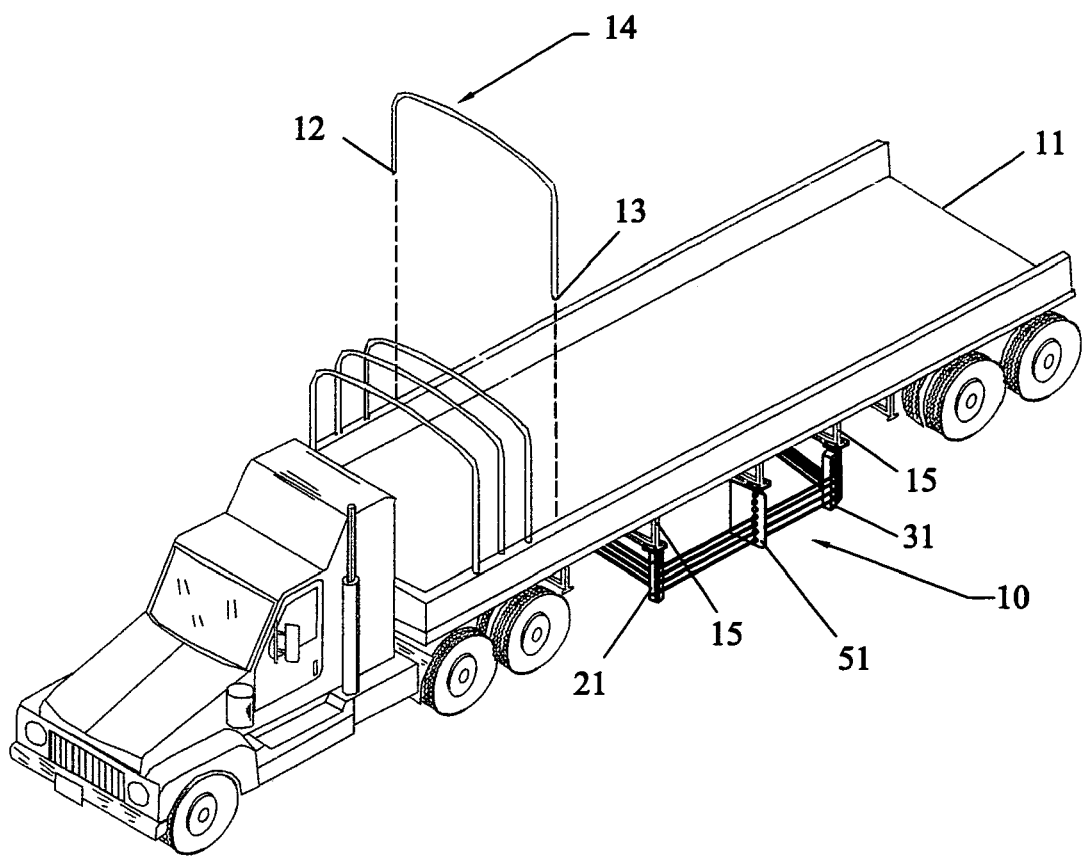
FIG. 1 illustrates one embodiment of the invention, a perspective view of the storage of the tarp bows underneath the flat bed of the trailer in accordance with the present invention.

Turning now in detail to the drawings, in accordance with the present invention, one embodiment of the invention is shown in FIG. 1, a perspective view of the storage of a plurality of tarp bows 10 underneath the flat bed trailer 11 in accordance with the present invention. The flat bed trailer 11 may be attached to a truck, tractor trailer or other vehicle, in other embodiments of the invention. Each of the tarp bows 10 have a first free end 12, a second free end 13, and at lease one middle section 14. The flat bed trailer 11 has a plurality of underside support beams 15. In the embodiment that is illustrated by FIG. 1, the present apparatus has a first holding block 21, a second holding block 31 and at least one pivoting center block 51. Different embodiments of the present invention include said holding blocks constructed of any round, square, or other shaped, hollow or solid, tubing of any form of rigid construction well known and commonly used in the applicable art.

Referring further to FIG. 1, one embodiment of the invention, each of said underside support beams 15 have top flanges 16 and bottom flanges 17 and a web 18.

Figure 2:
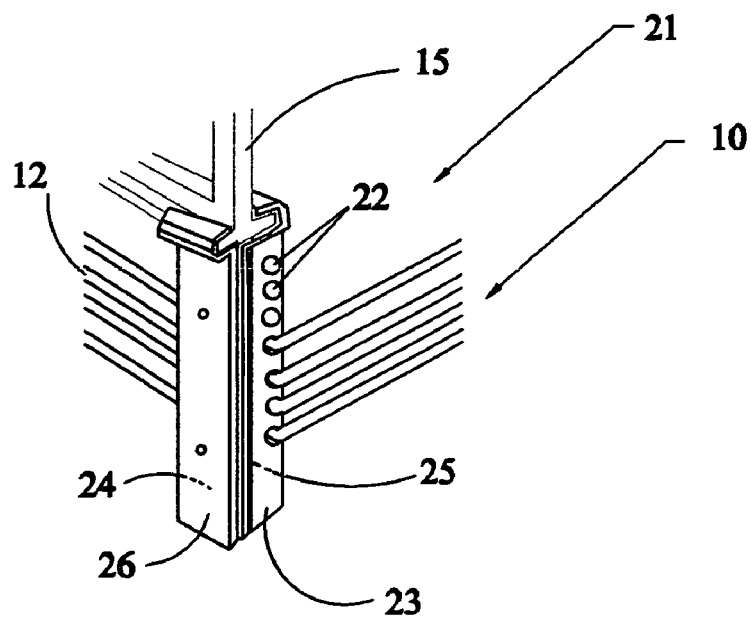
FIG. 2 illustrates one embodiment of the invention, a perspective view of the first holding block securing the first ends of the tarp bows in accordance with the present invention.

Referring to FIG. 2, one embodiment of the invention includes the first holding block 21 securing the first free ends 12 of said tarp bows 10 in accordance with the present invention. The first holding block 21 has a plurality of first spaced apertures 22 formed through said first holding block 21, each of said first spaced apertures 22 cooperatively sized and linearly located vertically on opposing first front aperture side 23 and first back aperture side 24 of the first holding block 21 for receiving and securing the first free end 12 of each of said tarp bows 10.

Figure 3:
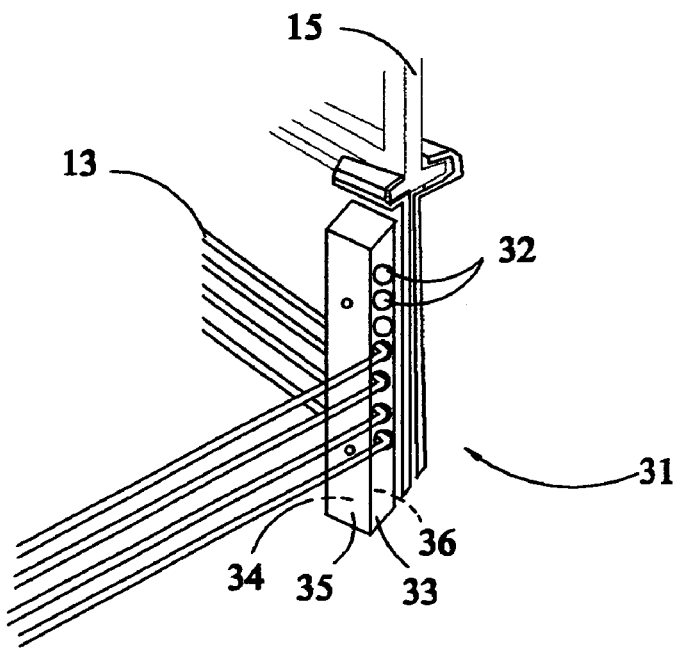
FIG. 3 illustrates one embodiment of the invention, a perspective view of the second holding block securing the second ends of the tarp bows in accordance with the present invention.

Referring to FIG. 3, one embodiment of the invention includes the second holding block 31 securing the second free ends 13 of the tarp bows 10 in accordance with the present invention. The second holding block 31 has a plurality of second spaced apertures 32 formed through said second holding block 31, each of said second spaced apertures 32 cooperatively sized and linearly located vertically on opposing second front aperture side 33 and second back aperture side 34 of the second holding block 31 for receiving and securing the second free end 13 of each of said tarp bows 10.

Figure 4:
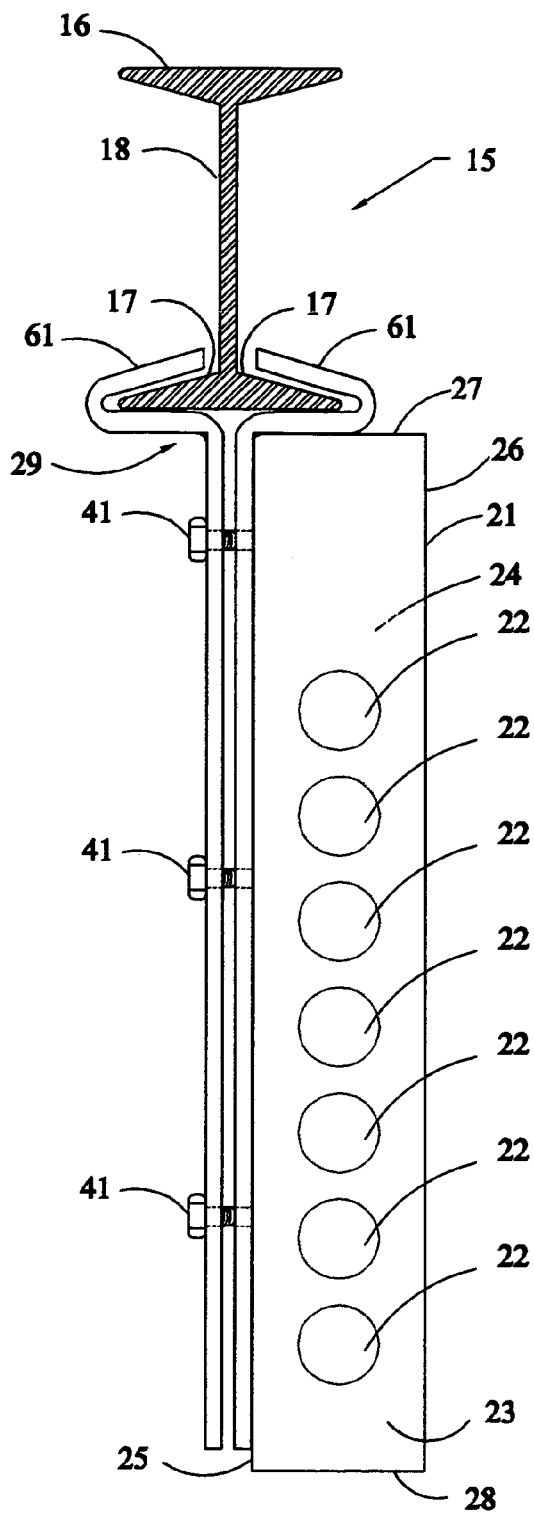
FIG. 4 illustrates one embodiment of the invention, a front view of the first holding block with attached first mounting means in accordance with the present invention.

Referring to FIGS. 2 and 4, one embodiment of the invention includes the first holding block 21 having opposing first inward closed side 25 and first outward closed side 26 adjacent to the first front aperture side 23 and the first back aperture side 24 of the first holding block 21.

Figure 5:
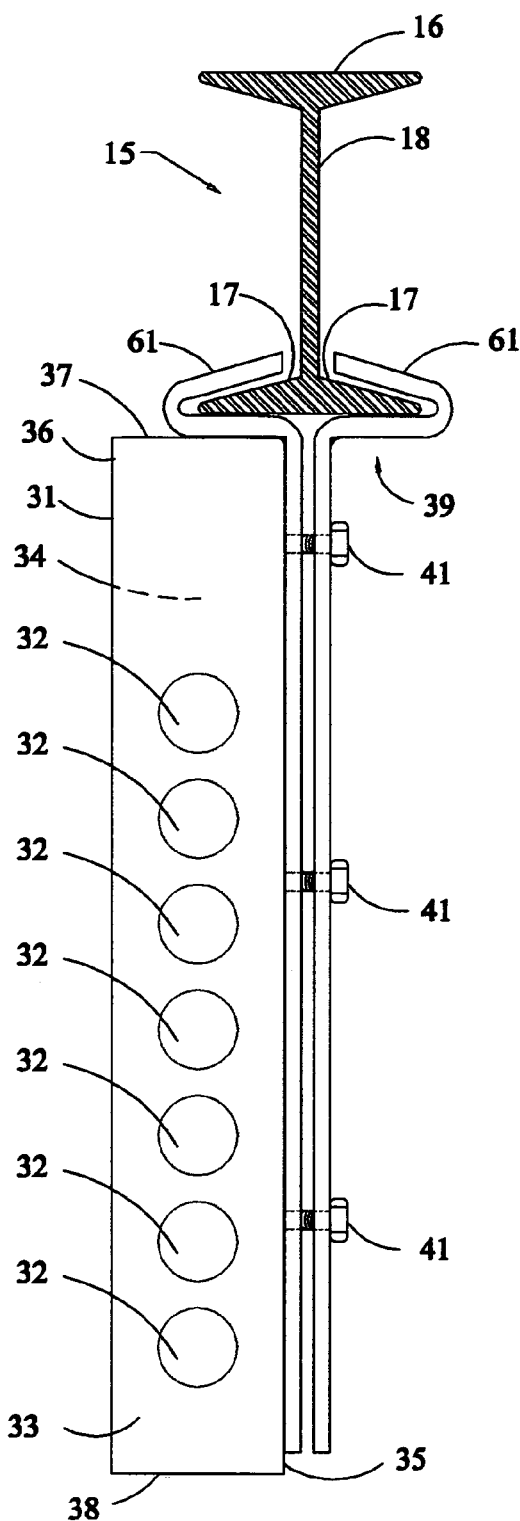
FIG. 5 illustrates one embodiment of the invention, a front view of the second holding with attached second mounting means in accordance with the present invention.

Referring to FIGS. 3 and 5, one embodiment of the invention includes the second holding block 31 having opposing second inward closed side 35 and second outward closed side 36 adjacent to the second front aperture side 33 and the second back aperture side 34 of the second holding block 31.

Referring to both FIGS. 4 and 5, one embodiment of the invention includes the first holding block 21 and the second holding block 31 having a first top side 27 and second top side 37 and a first bottom side 28 and second bottom side 38, respectively, and a first mounting means 29 and second mounting means 39, respectively. Each said mounting means (29 and 39, respectively) is vertically attached to the first holding block 21 and second holding block 31, respectively, along the first outward closed side 26 and second outward closed side 36 of each of said respective first holding block 21 and second holding block 31 by a plurality of fastening means 41. Different embodiments of the present invention include fastening means comprising threaded fasteners, such as screws, nuts and bolts, weldings, adhesives, rivets and other such fastening means well known and commonly used in the applicable art.

The respective first mounting means 29 and second mounting means 39 are used for engaging and securing said first holding block 21 and second holding block 31 to the underside support beams 15 of the flat bed trailer 11, as shown in the FIGS. 4 and 5, in one embodiment of the invention.

Figure 6:
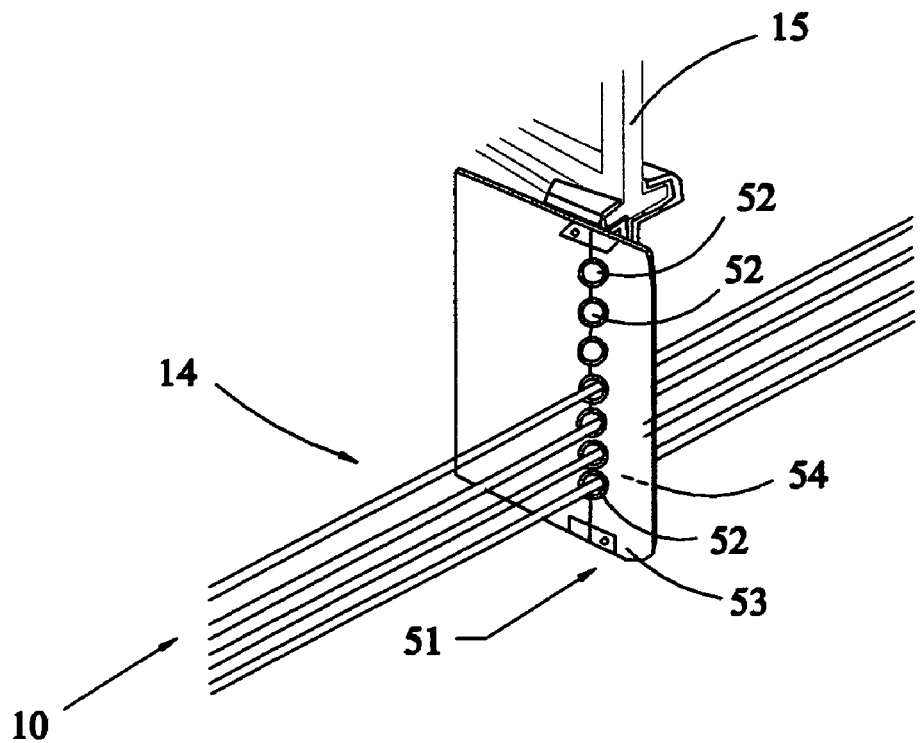
FIG. 6 illustrates one embodiment of the invention, a perspective view of at least one pivoting center block securing the at least one middle section of the tarp bows in accordance with the present invention.

Referring to FIG. 6, one embodiment of the invention includes the substantially planar at least one pivoting center block 51 having a plurality of center spaced apertures 52 formed through said pivoting center block 51, each of said center spaced apertures 52 cooperatively sized and linearly located vertically on opposing lefthand aperture side 53 and righthand aperture side 54 of the at least one pivoting center block, for receiving and securing the at least one middle section 14 of each of said tarp bows 10.

Figure 7:
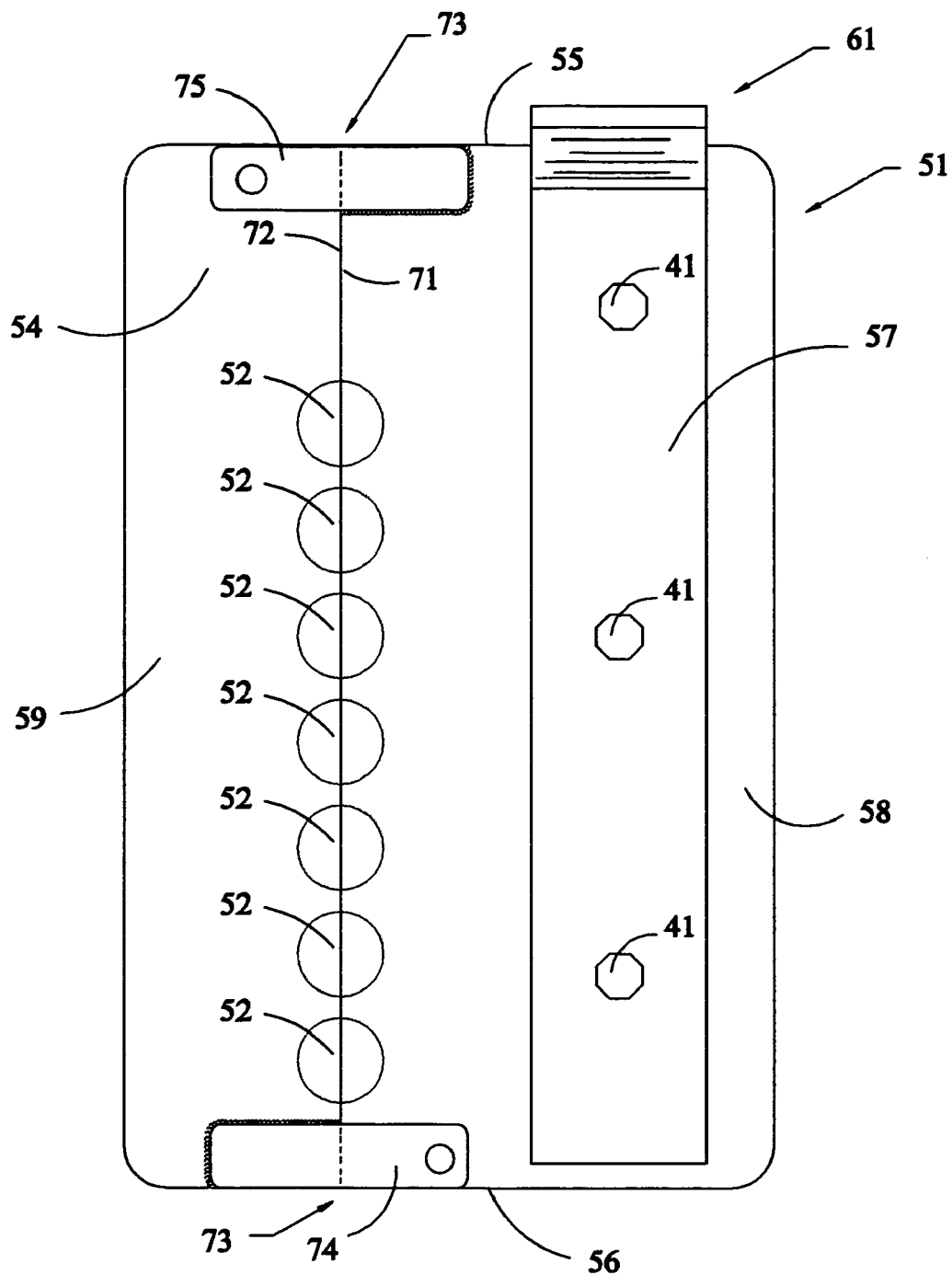
FIG. 7 illustrates one embodiment of the invention, a side view of the righthand aperture side of the pivoting center block in accordance with the present invention.

Referring to FIG. 7, one embodiment of the invention includes at least one pivoting center block 51 having a top edge 55 and a bottom edge 56, and a center mounting means 57 vertically attached by fastening means 41 to said righthand aperture side 54 of the at least one pivoting center block 51.

Figure 8:
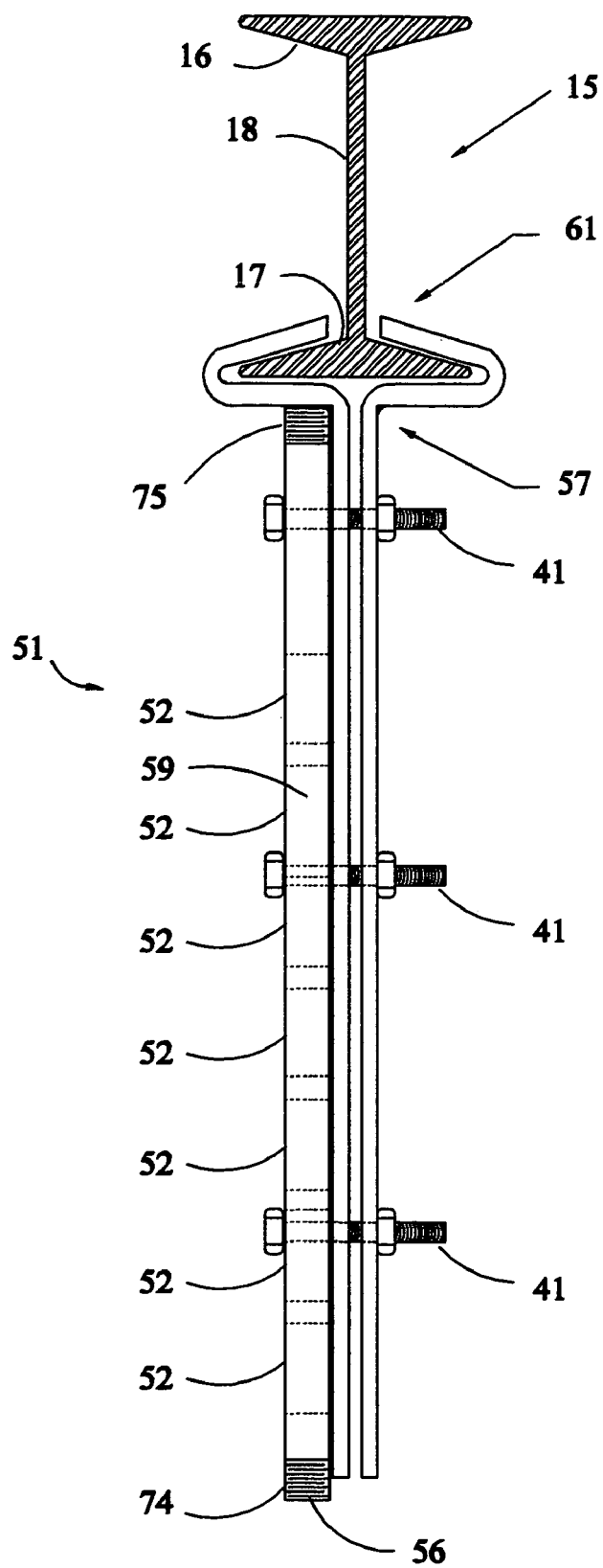
FIG. 8 illustrates one embodiment of the invention, a front view of the pivoting center block with attached center mounting means in accordance with the present invention.

Referring to FIGS. 1 and 8, one embodiment of the invention includes the center mounting means 57 attached on the at least one pivoting center block 51 for engaging and securing the at least one pivoting center block 51 to at least one of said underside support beams 15 of the flat bed trailer 11. Referring to FIGS. 4, 5, and 8, one embodiment of the invention includes each of the said mounting means (29, 39, and 57, respectively) having a pair of bracket members 61, each respective pair of bracket members 61 extending above the respective first top side 27 of the first holding block 21, the second top side 37 of the second holding block 31, and the top edge 55 of the at least one pivoting center block 51. Each pair of bracket members 61 to each of said mounting means (29, 39, and 57, respectively) of each of the first holding block 21 and second holding block 31 and the at least one pivoting center block 51 are adapted to overlie and be disposed on opposite sides of the bottom flanges 17 to an underside support beam 15 of the flat bed trailer 11. The first holding block 21 and second holding block 31 are attached to said underside support beams 15 by the respective first mounting means 29 and second mounting means 39, and the at least one pivoting center block 51 is attached to at least one of said underside support beams 15 by the center mounting means 57.

Referring again to FIGS. 1, 2, 3, and 6, one embodiment of the invention includes the plurality of first spaced apertures 22 and the plurality of second spaced apertures 32 to the first holding block 21 and second holding block 31, respectively, and the plurality of center spaced apertures 52 to the at least one center pivot center block 51 longitudinally aligned to each other for concurrently receiving the first free end 12, the second free end 13, and at least one middle section 14 of each of the plurality of tarp bows 10 in spaced relation.

Figure 9:
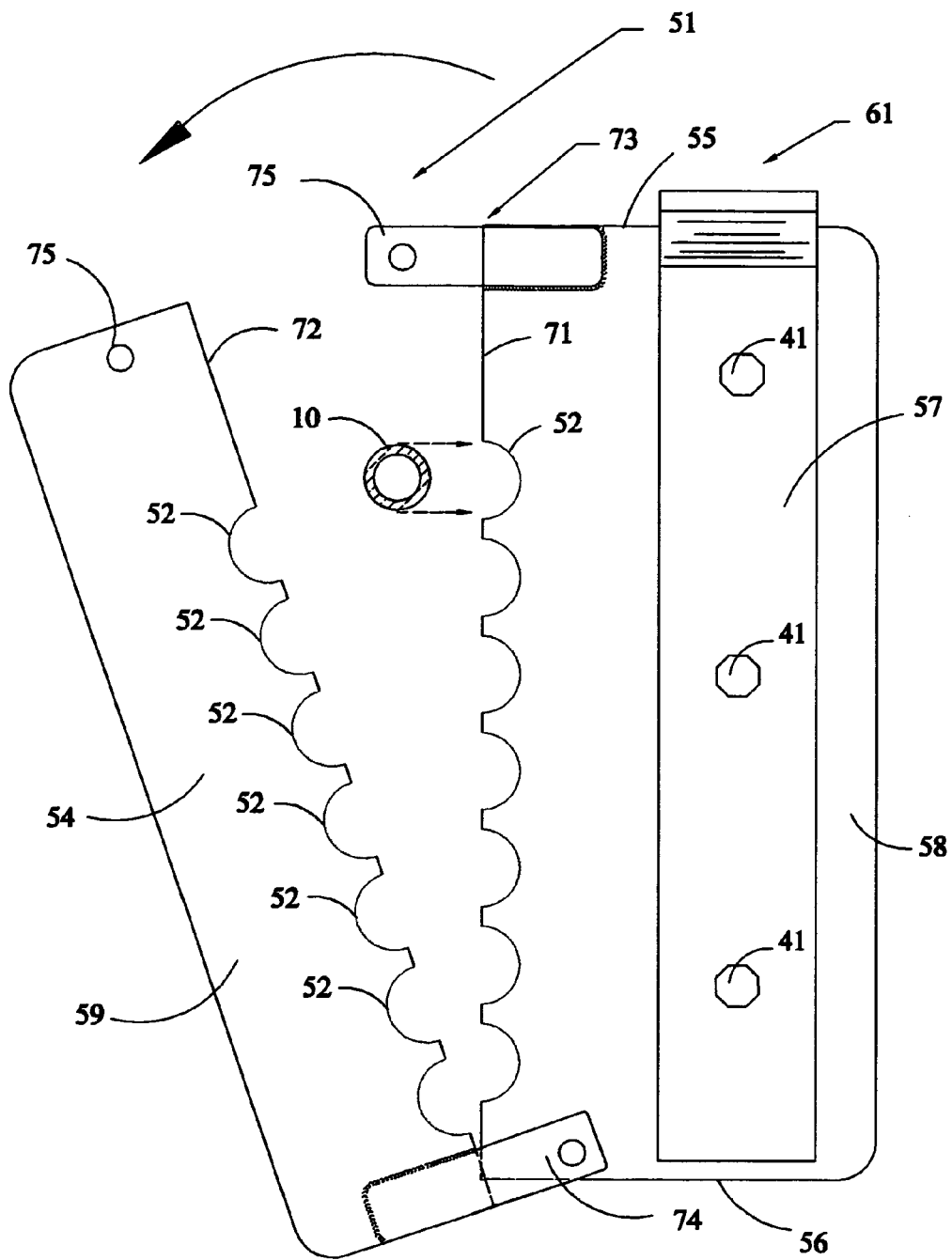
FIG. 9 illustrates one embodiment of the invention, a side view of the righthand aperture side of the pivoting portion and the stationary portion of the pivoting center block in accordance with the present invention.

Referring to FIGS. 7 and 9, one embodiment of the invention includes the at least one pivoting center block 51 has a stationary portion 58 and a pivoting portion 59, the stationary portion 58 and pivoting portion 59 each having a stationary edge 71 and pivoting edge 72, respectively. The stationary edge 71 and the pivoting edge 72 adjoin each other along a line bisecting each of a plurality of center spaced apertures 73 of the at least one pivoting center block. The stationary portion 58 is pivotally and cooperatively connected to the pivoting portion 59 by a pivoting means 74 located along the line bisecting each of the plurality of center spaced apertures 73 of the pivoting center block 51. The pivoting means 74 is located proximate to the bottom edge 56 of the at least one pivoting center block 51. Different embodiments of the present invention include pivoting means 74 comprising a pin and a cotter key, a nut and bolt, a welded rivet, and other such pivoting means well known and commonly used in the applicable art. Referring to FIGS. 6 and 9, the pivoting means 74 for pivoting said pivoting portion 59 away from the stationary portion 58 enables the at least one pivoting center block 51 to receive the at least one middle section 14 of each of said tarp bows 10 within the plurality of center spaced apertures 52 along the stationary edge 71 of the stationary portion 58.

Referring to FIGS. 2, 3, 6, and 9, one embodiment of the invention includes the at least one middle section 14 of each of said tarp bows 10 being enclosed within the plurality of center spaced apertures 52 of the at least one pivoting center block 51 when the pivoting portion 59 pivots toward the stationary portion 58 by a locking means 75 for locking the at least one middle section 14 of each of said tarp bows 10 within the at least one pivoting center block 51. The locking means 75 is located along the line bisecting each of the plurality of center spaced apertures 73 of the at least one pivoting center block 51 and proximate to the top edge 55 of the at least one pivoting center block 51. The at least one pivoting center block 51 is cooperatively located in spaced relation between the first holding block 21 and the second holding block 31 to receive and lock the at least one middle section 14 of each of said tarp bows 10 securely in place and align each of said tarp bows 10 in a stacked fashion 81, whereby the plurality of tarp bows 10 are stored to the underside of the flat bed trailer 11. Different embodiments of the present invention include locking means 75 comprising an aperture through the pivoting center block into shich a padlock or other commonly used devices may be employed and other such locking means well known and commonly used in the applicable art. Different embodiments of the present invention include the pivoting means 74 and the locking means 75 situated in each said means respective location. In one embodiment, the apparatus includes exactly one pivoting center block 51.

In one embodiment, the apparatus includes a first holding block 21, second holding block 31, at least one pivoting center block 31, first mounting means 29, second mounting means 39, and center mounting means 57, including the pair of bracket members to each said mounting means (29, 39, and 57, respectively) that are metal.

Figure 10:
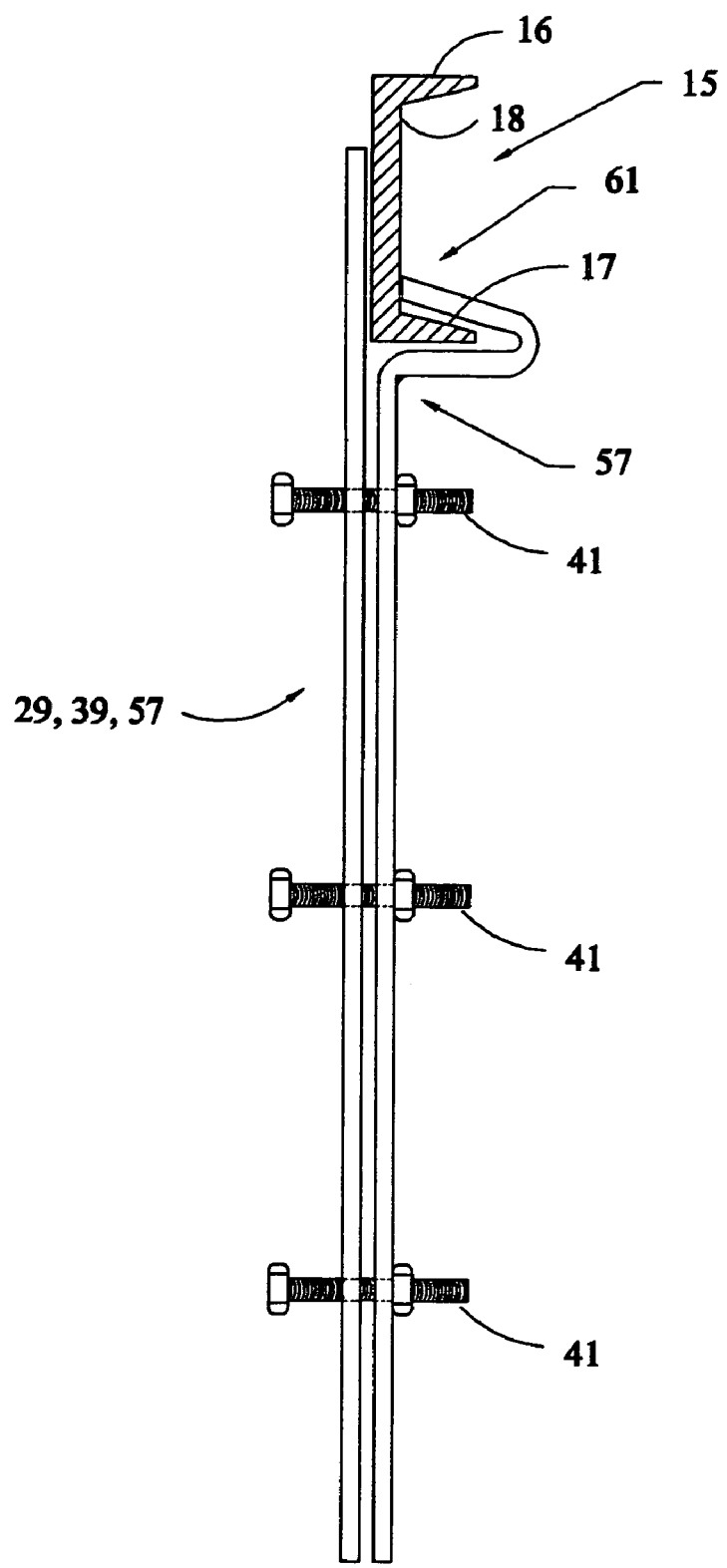
FIG. 10 illustrates one embodiment of this invention, a side view of the mounting means of the respective blocks modified to overlie and be disposed on a support beam having only one top flange and one bottom flange.

Referring to FIG. 10, of the invention includes one embodiment, the apparatus includes pairs of bracket members 61 of the said mounting means (29, 39, and 57, respectively) that are modified to overlie and be disposed on said support beams 15 having a web 18, only one top flange 16 and one bottom flange 17.

Referring to FIGS. 1, 2, 3, and 6, the invention may be embodied in forms having the first and second mounting means (29 and 39 respectively) and the center mounting means 57 vertically attached to alternate closed sides (25 or 26 and 35 or 36 respectively) of the respective first and second holding blocks (21 and 31) and to alternate aperture sides (53 or 54) of said pivoting center block 51.

The elements of the invention shown and described above in one embodiment of the invention provide a method for storing a plurality of tarp bows to a flat bed trailer.

Unless otherwise specifically stated, the terms and expressions have been used herein as terms of description and not terms of limitation. There is no intention to use the terms or expressions to exclude any equivalents of features shown and described or portions thereof. Various changes can, of course, be made to the preferred embodiment of the present invention without departing from the spirit and scope of the present invention. The present invention, therefore, should not be restricted, except to the following claims and their equivalents.

I claim:

1. A tarp bow storing apparatus for storing a plurality of tarp bows to a flat bed trailer, comprising:
  (a) a plurality of tarp bows each having a first free end a second free end and at least one middle section;
  (b) a first holding block having a plurality of first spaced apertures formed through said first holding block, each of said first spaced apertures cooperatively sized and linearly located vertically on opposing first front aperture side and first back aperture side of the first holding block for receiving and securing the first free end of each of said tarp bows;
  (c) the first holding block having opposing first inward closed side and first outward closed side, each of said first inward and outward closed sides adjacent to said first front and back aperture sides of the first holding block;
  (d) a second holding block having a plurality of second spaced apertures formed through said second holding block, each of said second spaced apertures cooperatively sized and linearly located vertically on opposing second front aperture side and second back aperture side of the second holding block for receiving and securing the second free end of each of said tarp bows;
  (e) the second holding block having opposing second inward closed side and second outward closed side, each of said second inward and outward closed sides adjacent to said second front and back aperture sides of the second holding block;
  (f) each of said first and second holding blocks having a first top side and a second top side and a first bottom side and second bottom side, respectively, and a first mounting means and a second mounting means, respectively, each vertically attached to said first and second holding blocks, respectively, along said first and second outward closed sides of each of said respective first and second holding blocks by a plurality of fastening means;
  (g) said flat bed trailer having a plurality of underside support beams;
  (h) said respective first and second mounting means for engaging and securing said first holding block and second holding block to said underside support beams of the flat bed trailer;
  (i) a substantially planar at least one pivoting center block having a plurality of center spaced apertures formed through said pivoting center block, each of said center spaced apertures cooperatively sized and linearly located vertically on opposing lefthand aperture side and righthand aperture side of the at least one pivoting center block for receiving and securing the at least one middle section of each of said tarp bows;
  (j) said at least one pivoting center block having a top edge and a bottom edge, and a center mounting means vertically attached by said fastening means to said righthand aperture side of the at least one pivoting center block;
  (k) said center mounting means on the at least one pivoting center block for engaging and securing the at least one pivoting center block to at least one of said underside support beams of the flat bed trailer;
  (l) each of said underside support beams having top flanges, bottom flanges, and a web;
  (m) said first and second mounting means attached to the first and second holding blocks, respectively, and said center mounting means attached to the at least one pivoting center block, each said mounting means including a pair of bracket members, each respective pair of bracket members extending above the respective first top side of the first holding block, the second top side of the second holding block, and the top edge of the at least one pivoting center block;
  (n) each of said pair of bracket members to each of said mounting means of each of the first and second holding blocks and the at least one pivoting center block adapted to overlie and be disposed on opposite sides of the bottom flanges to said underside support beams of the flat bed trailer;
  (o) said first and second holding blocks attached to said underside support beams by the respective first and second mounting means, and the at least one pivoting center block attached to at least one of said underside support beams by the center mounting means;
  (p) said first and second spaced apertures to the first and second holding blocks, respectively, and said center spaced apertures to the at least one center pivot center block being longitudinally aligned to concurrently receive the first free end, the second free end, and the at least one middle section of each of said tarp bows, in spaced relation;

(q) the at least one pivoting center block having a stationary portion and a pivoting portion, said stationary portion and pivoting portion each having a stationary edge and a pivoting edge, respectively, said stationary and pivoting edges adjoining each other along a line bisecting each of the plurality of center spaced apertures of the pivoting center block;

(r) the stationary portion pivotally and cooperatively connected to the pivoting portion by a pivoting means located along the line bisecting each of the plurality of center spaced apertures of the at least one pivoting center block, said pivoting means located proximate to the bottom edge of the at least one pivoting center block;

(s) the pivoting means for pivoting said pivoting portion away from the stationary portion, enabling the at least one pivoting center block to receive the at least one middle section of each of said tarp bows within said center spaced apertures along the stationary edge of the stationary portion;

(t) the at least one middle section of each of said tarp bows being enclosed within said center spaced apertures of the at least one pivoting center block when the pivoting portion pivots toward the stationary portion by a locking means for locking the at least one middle section of each of said tarp bows within the at least one pivoting center block, said locking means located along the line bisecting each of the plurality of center spaced apertures of the at least one pivoting center block and proximate to the top edge of the at least one pivoting center block;

(u) said at least one pivoting center block cooperatively located in spaced relation between said first and second holding blocks, to receive and lock the at least one middle section of each of said tarp bows securely in place and align each of said tarp bows in a stacked fashion; and (v) whereby the plurality of tarp bows are stored to the underside of the flat bed trailer.

2. An apparatus according to claim 1, further comprising exactly one pivoting center block.

3. An apparatus according to claim 1, wherein the first holding block, the second holding block, the at least one pivoting center block, the first mounting means, the second mounting means, the center mounting means and the bracket members of the respective mounting means are metal.

4. An apparatus according to claim 1, wherein the bracket members of the respective mounting means are modified to overlie and be disposed on support beams having only one top flange and one bottom flange.

5. An apparatus according claim 1, wherein said first and second mounting means are vertically attached to alternate closed sides of the respective said first and second holding blocks and said center mounting means is vertically attached to alternate aperture sides of said pivoting center block.

6. A method for storing a plurality of tarp bows to a flat bed trailer, the method comprising:

(a) having a plurality of tarp bows each having a first free end, a second free end and at least one middle section;

(b) providing a first holding block having a plurality of first spaced apertures formed through said first holding block, each of said first spaced apertures cooperatively sized and linearly located vertically on opposing first front aperture side and first back aperture side of the first holding block for receiving and securing the first free end of each of said tarp bows;

(c) providing the first holding block with opposing first inward closed side and first outward closed side, each of said first inward and outward closed sides adjacent to said first front and back aperture sides of the first holding block;

(d) providing a second holding block having a plurality of second spaced apertures formed through said second holding block, each of said second spaced apertures cooperatively sized and linearly located vertically for on opposing second front aperture side and second back aperture side of the second holding block for receiving and securing the second free end of each of said tarp bows;

(e) providing the second holding block with opposing second inward closed side and second outward closed side, each of said second inward and outward closed sides adjacent to said second front and back aperture sides of the second holding block;

(f) having a first top side and a second top side and a first bottom side and a second bottom side, respectively, to each of said first and second holding blocks;

(g) vertically attaching a first mounting means and second mounting means by a plurality of fastening means to said first and second holding blocks, respectively, along said first and second outward closed sides of each of said respective first and second holding blocks;

(h) having a plurality of underside support beams to said flat bed trailer;

(i) engaging and securing said first holding block and second holding block by said respective first and second mounting means to said underside support beams of the flat bed trailer;

(j) providing a substantially planar at least one pivoting center block having a plurality of center spaced apertures formed through said pivoting center block, each of said center spaced apertures cooperatively sized and linearly located vertically on opposing lefthand aperture side and righthand aperture side of the at least one pivoting center block for receiving and securing the at least one middle section of each of said tarp bows;

(k) having a top edge and a bottom edge to said at least one pivoting center block;

(l) vertically attaching a center mounting means by said fastening means to said righthand aperture side of the at least one pivoting center block;

(m) engaging and securing the at least one pivoting center block by said center mounting means to at least one of said underside support beams of the flat bed trailer;

(n) having top flanges, bottom flanges, and a web to each of said underside support beams;

(o) providing a pair of bracket members to each of said first and second mounting means attached to the respective first and second holding blocks, and to said center mounting means attached to the at least one pivoting center block, each respective pair of bracket members extending above the respective first top side of the first holding block, the second top side of the second holding block, and the top edge of the at least one pivoting center block;

(p) adapting each of said pair of bracket members to said mounting means of each of the first and second holding blocks and the at least one pivoting center block to overlie and be disposed on opposite sides of the bottom flanges to said underside support beams of the flat bed trailer;

(q) attaching said first and second holding blocks to said underside support beams by the respective first and second mounting means and attaching the at least one pivoting center block to at least one of said underside support beams by the center mounting means;

(r) longitudinally aligning said first and second spaced apertures to the first and second holding blocks, respectively, and said center spaced apertures to the at least one center pivot center block to concurrently receive the first free end, the second free end, and the at least one middle section of each of said tarp bows, in spaced relation;

(s) providing a stationary portion and a pivoting portion to the at least one pivoting center block, said stationary and pivoting portion each having a stationary edge and a pivoting edge, respectively, said stationary and pivoting edges adjoining each other along a line bisecting each of the plurality of center spaced apertures of the pivoting center block;

(t) pivotally and cooperatively connecting said stationary portion to said pivoting portion by a pivoting means located along the line bisecting each of the plurality of center spaced apertures of the at least one pivoting center block, said pivoting means located proximate to the bottom edge of the at least one pivoting center block;

(u) applying the pivoting means for pivoting said pivoting portion away from the stationary portion, enabling the at least one pivoting center block to receive the at least one middle section of each of said tarp bows within said center spaced apertures along the stationary edge of the stationary portion;

(v) enclosing the at least one middle section of each of said tarp bows within said center spaced apertures of the at least one pivoting center block when the pivoting portion pivots toward the stationary portion by a locking means for locking the at least one middle section of each of said tarp bows within the at least one pivoting center block, said locking means located along the line bisecting each of the plurality of center spaced apertures of the pivoting center block and proximate to the top edge of the at least one pivoting center block;

(w) cooperatively locating the at least one pivoting center block in spaced relation between said first and second holding blocks, to receive and lock the at least one middle section of each of said tarp bows securely in place and align said tarp bows in a stacked fashion; and (q) thereby storing the plurality of tarp bows to the underside of the flat bed trailer.

7. A method according to claim 6, further comprising exactly one pivoting center block.

8. A method according to claim 6, wherein the first holding block, the second holding block, the at least one pivoting center block, the first mounting means, the second mounting means, the center mounting means and the bracket members of the respective mounting means are metal.

9. A method according to claim 6, further comprising modifying the bracket members of the respective mounting means to overlie and be disposed on support beams having only one top flange and one bottom flange.

10. A method according to claim 6, wherein said first and second mounting means are vertically attached to alternate closed sides of the respective said first and second holding blocks and said center mounting means is vertically attached to alternate aperture sides of said pivoting center block.

* * * * *